United States Patent [19]

Tincher

[11] Patent Number: 4,500,769
[45] Date of Patent: Feb. 19, 1985

[54] ROTARY WELD GUN SUPPORT WITH ELECTRICAL COUPLING

[75] Inventor: Jon D. Tincher, Troy, Mich.

[73] Assignee: General Motors Corporation, Detroit, Mich.

[21] Appl. No.: 473,666

[22] Filed: Mar. 9, 1983

[51] Int. Cl.³ .............................................. B23K 11/10
[52] U.S. Cl. ................................. 219/86.33; 219/86.1; 219/86.25; 901/42
[58] Field of Search .................... 219/86.1, 86.25, 86.8, 219/86.33; 901/42; 174/86; 200/275, 279

[56] References Cited

U.S. PATENT DOCUMENTS

| 1,665,067 | 3/1928 | Meadowcroft | 219/86.33 |
| 2,359,351 | 10/1944 | Bruno | 174/21 JR |
| 4,348,575 | 9/1982 | Hedren et al. | 219/86.33 |

Primary Examiner—Roy N. Envall, Jr.
Assistant Examiner—Alfred S. Keve
Attorney, Agent, or Firm—Warren D. Hill

[57] ABSTRACT

In a resistance welding device wherein the welding gun is carried by a robot for rotation about a robot axis, an electrical slip ring assembly for carrying weld current to the weld gun also supports the rotary weld gun. Axially stacked collector discs insulated from one another are electrically and mechanically connected to separate bus members for connection to the weld gun and a pair of adapter plates for connecting the assembly to the rotary drive of a robot and to a weld gun respectively are all bolted together into a unitary rotary arbor assembly. Each collector disc presents a cylindrical outer surface and a nonrotating supply ring surrounds each disc and is connected to one terminal of a power supply. The supply rings are expansible and a fluid actuator operates each supply ring to clamp it tightly to its corresponding collector disc for good electrical connection and to release the ring from the collector disc to allow rotation of the arbor assembly.

4 Claims, 6 Drawing Figures

ROTARY WELD GUN SUPPORT WITH ELECTRICAL COUPLING

This invention relates to a rotary electrical coupling for supporting a resistance spot weld gun and supplying electrical current thereto.

Resistance spot welding is frequently carried out by automatic machines such as industrial robots which have several degrees of freedom for positioning the weld electrodes in any desired position or attitude within the sweep of the robot arm. While the robots themselves are readily adapted to such versatile movements a constraint peculiar to resistance welding operations is the number of electrical conductors and fluid hoses required in the weld gun operation. While the hoses in general are small and sufficiently flexible to accommodate substantial weld gun movements the flexible cables carrying the weld current which is typically of the order of a 20,000 amperes are rather large in diameter and are limited in their flexibility so that weld gun movement is constrained if the cable is attached directly to the weld gun. Common industrial robots have a wrist motion capable of 360° rotation about the wrist axis and it is desirable to take advantage of that rotation for flexibility in weld gun placement. In addition it is desirable to use a dual weld gun, that is, a welding apparatus having two pairs of weld electrodes positioned close to each other and operated simultaneously. Such an arrangement requires two complete current paths between a power supply and the electrodes. It has previously been proposed to add to the rotary support for weld gun electrical contact devices which allow weld gun rotation as well as current supply to the weld gun. Such devices separate the electrical current carrying and the mechanical load carrying functions of the rotary coupling.

It is therefore an object of this invention to provide an apparatus for rotatably supporting a weld gun and coupling weld current to the weld gun through the load carrying structure. It is a further object of the invention to provide such an apparatus for carrying one or more pairs of conductive pathways through the load carrying member.

The invention is carried out by providing a rotatable arbor assembly for supporting a weld gun assembly having a plurality of cylindrical collectors insulated from one another, bus means coupling each collector to the weld gun, fasteners tying the collectors and bus means together into a load bearing assembly, current supply rings surrounding the collectors, respectively, and an arrangement for clamping the rings to the collectors to complete an electrical circuit between the rings and the collectors and for selectively releasing the rings from the collectors to allow rotation of the arbor assembly relative to the supply rings.

The above and other advantages will be more apparent from the following description taken in conjunction with the accompanying drawings in which like reference numerals refer to like parts and in which.

Figure 1:
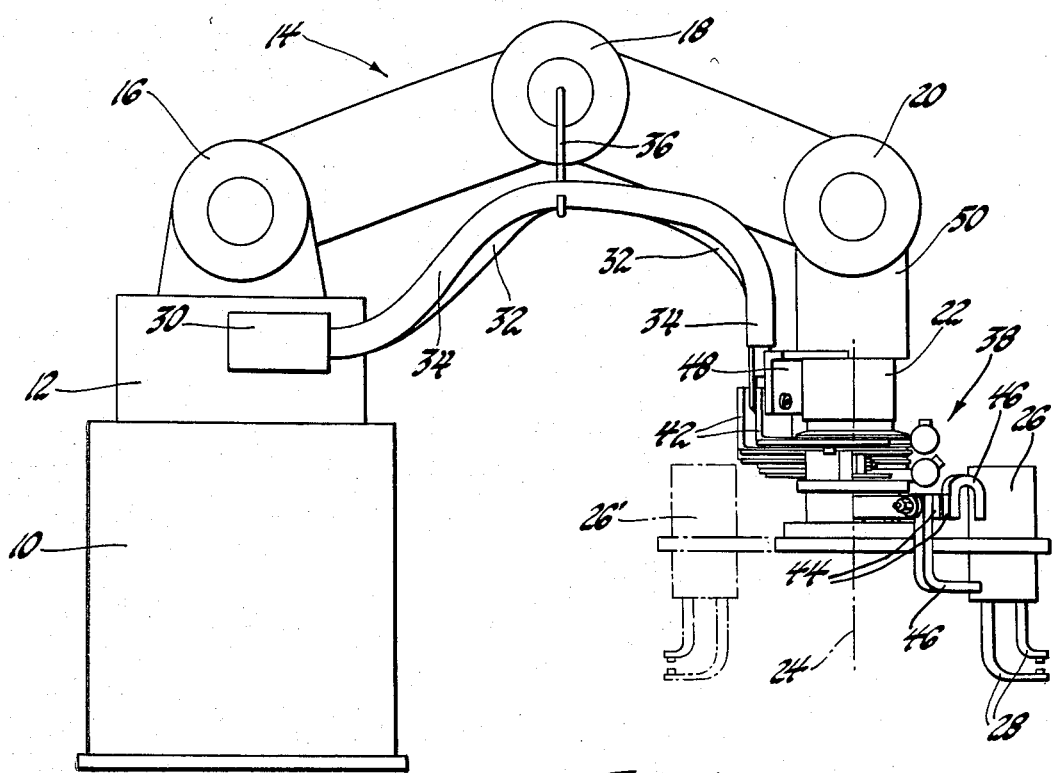
FIG. 1 is an elevation of a robot carrying a welding gun through a rotary coupling according to the invention.
Figure 2:
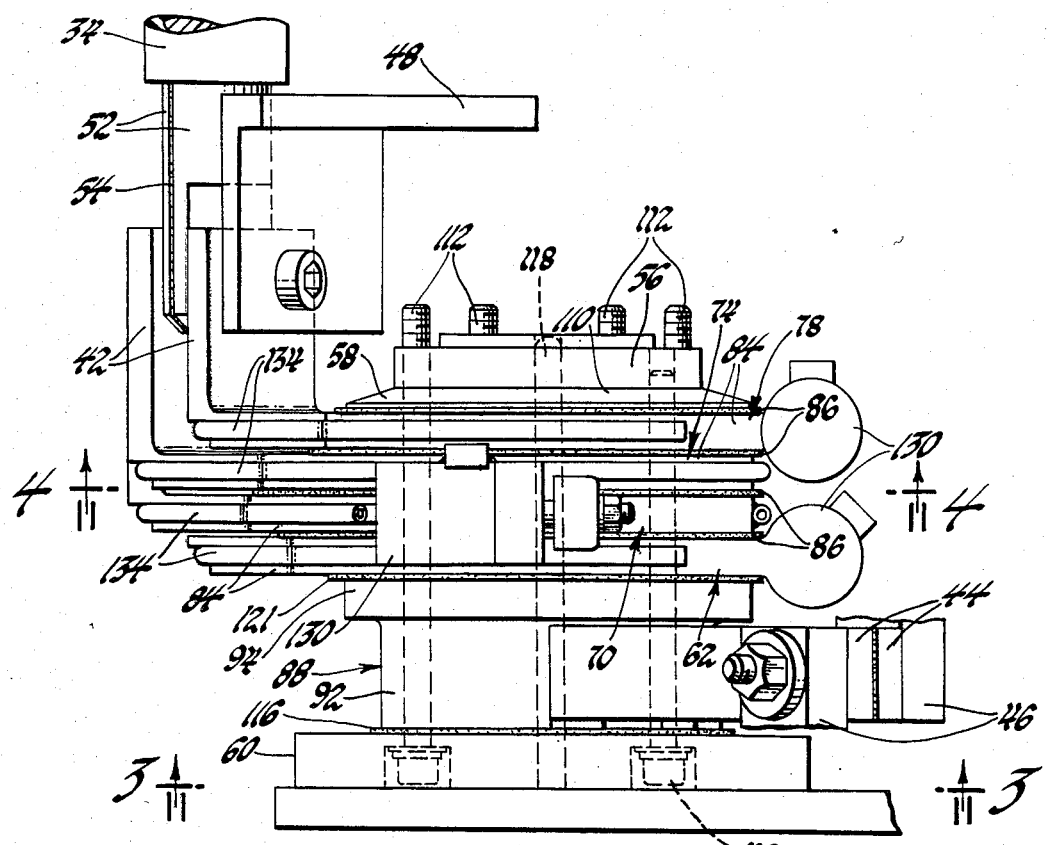
FIG. 2 is an enlarged view of the rotary coupling of FIG. 1.
Figure 3:
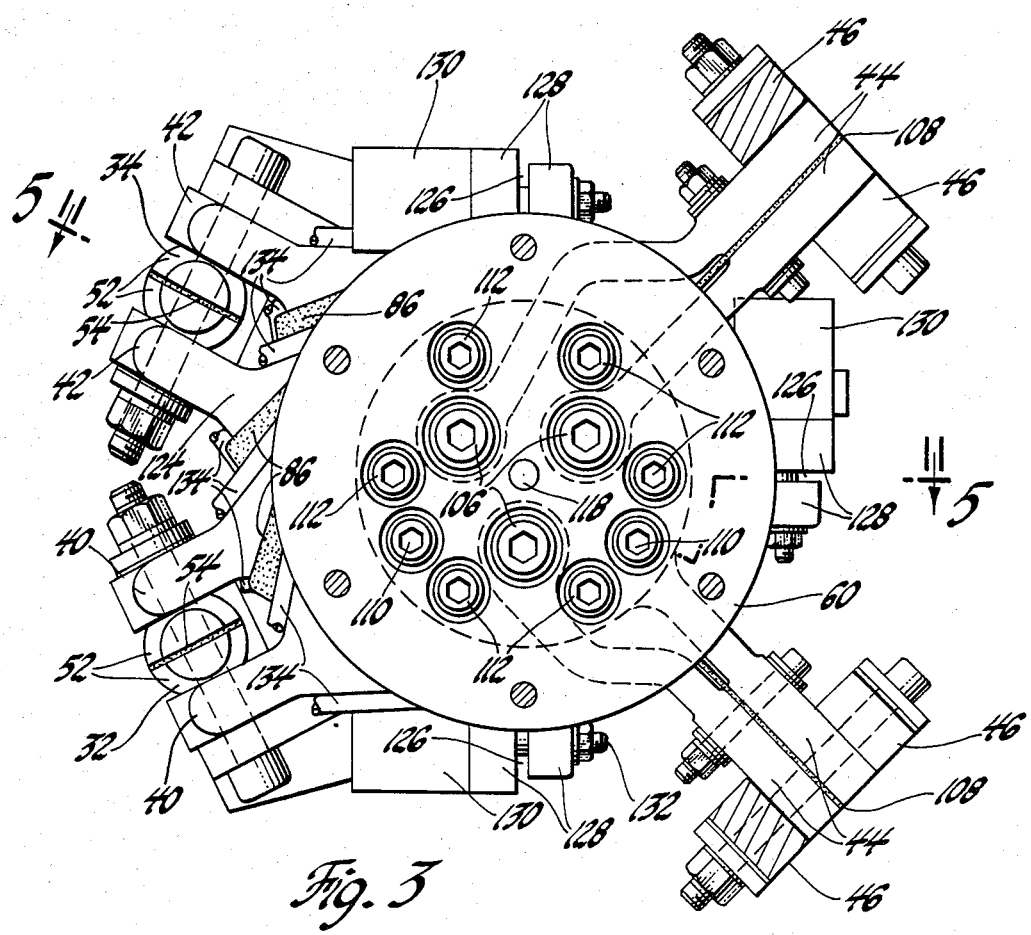
FIG. 3 is a view of a rotary coupling taken along line 3—3 of FIG. 2.

In FIG. 1 a robot comprises a base 10 carrying a turntable 12 for rotation about a vertical axis and which in turn carries a robot arm 14 having a plurality of joints 16, 18 and 20. A wrist joint 22 provides rotation about its own axis 24 and carries the resistance spot weld gun 26 which may be positioned anywhere within the range of the arm and controlled by operation of the various joints. By rotation of the wrist joint 22, the weld gun 26 may be rotated 360° and may, for example, assume the position shown in the phantom lines at 26'. Preferably, the weld gun 26 is a dual weld gun carrying two pairs of electrodes located close together and operated simultaneously. Electrodes 28 as shown in FIG. 1 are in front of and hide the second pair of electrodes. Each pair of electrodes, however, requires a separate pair of conductor paths to supply the current. A weld transformer 30 mounted on the turntable 12 supplies current through two electrical cables 32 and 34 which are sufficiently long and flexible to follow the motion of the arm 14 and are carried by the arm as by a hanger 36. The cables are not sufficiently flexible to repeatedly follow the wrist motion which allows the rotation of the gun substantially 360° about the axis 24. Consequently, according to this invention, a rotary coupling 38 is provided to furnish both a load bearing support of the weld gun as well as electrical coupling between the weld gun and the cables. The cable 34 is connected to terminals 42 of the rotary coupling and, as better shown in FIG. 3, the cable 32 is connected to the terminals 40. Output buses 44 of the coupling are connected through flexible conductors 46 to the weld gun 26. The input terminals 40 are held against rotation by a bracket 48 secured to a nonrotatable housing 50 whereas the output buses 44 do rotate about the axis 24 and thus maintain a relatively stable position relative to the weld gun 26. As best shown in FIGS. 2 and 3, each cable 32 and 34 terminates in two lugs 52 separated by an insulating spacer 54, each of the lugs being in secure contact with one of the input terminals 40 or 42.

Figure 4:
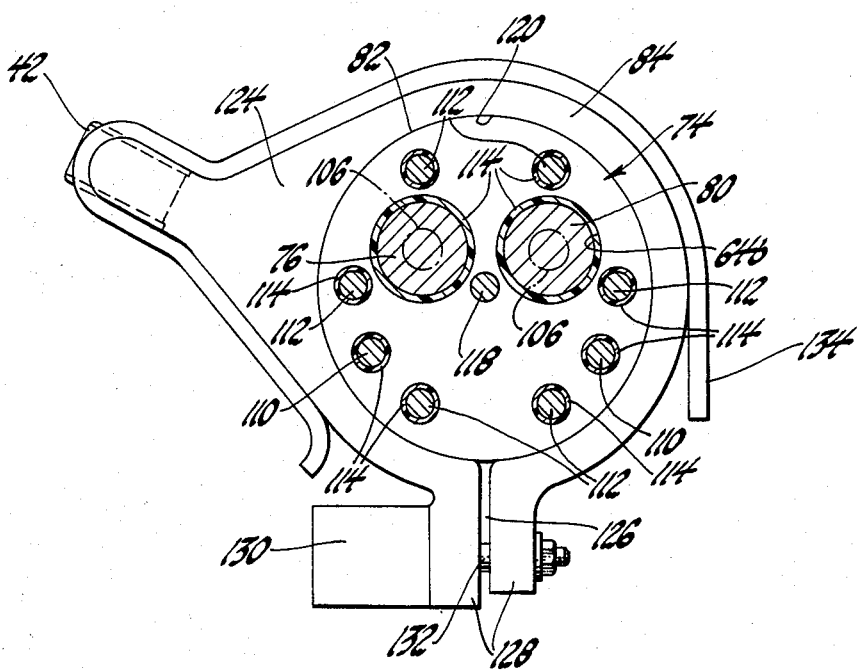
FIG. 4 is a view of the rotary coupling taken along lines 4—4 of FIG. 2 with parts eliminated for clarity.
Figure 5:
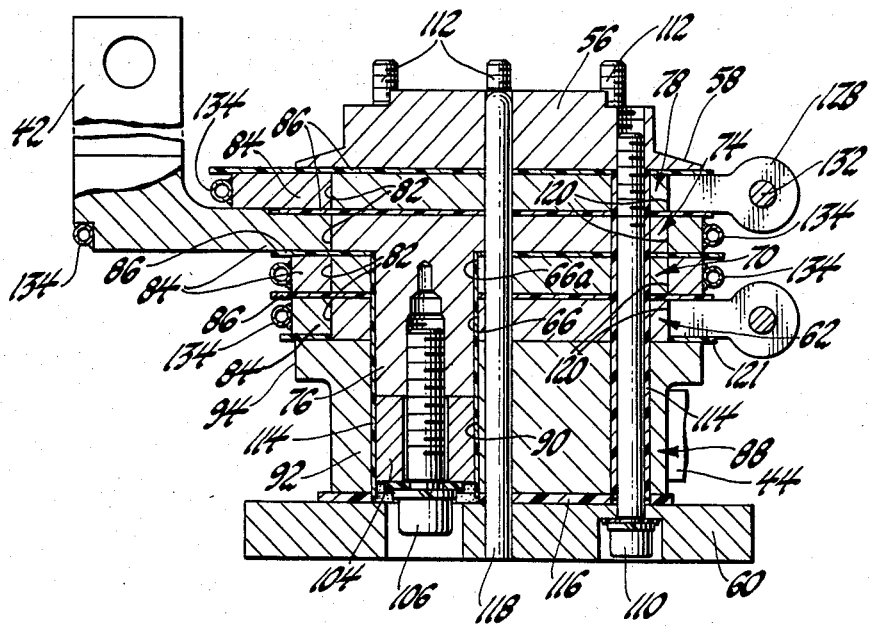
FIG. 5 is a cross-sectional view of the rotary coupling taken along line 5—5 of FIG. 3.
Figure 6:
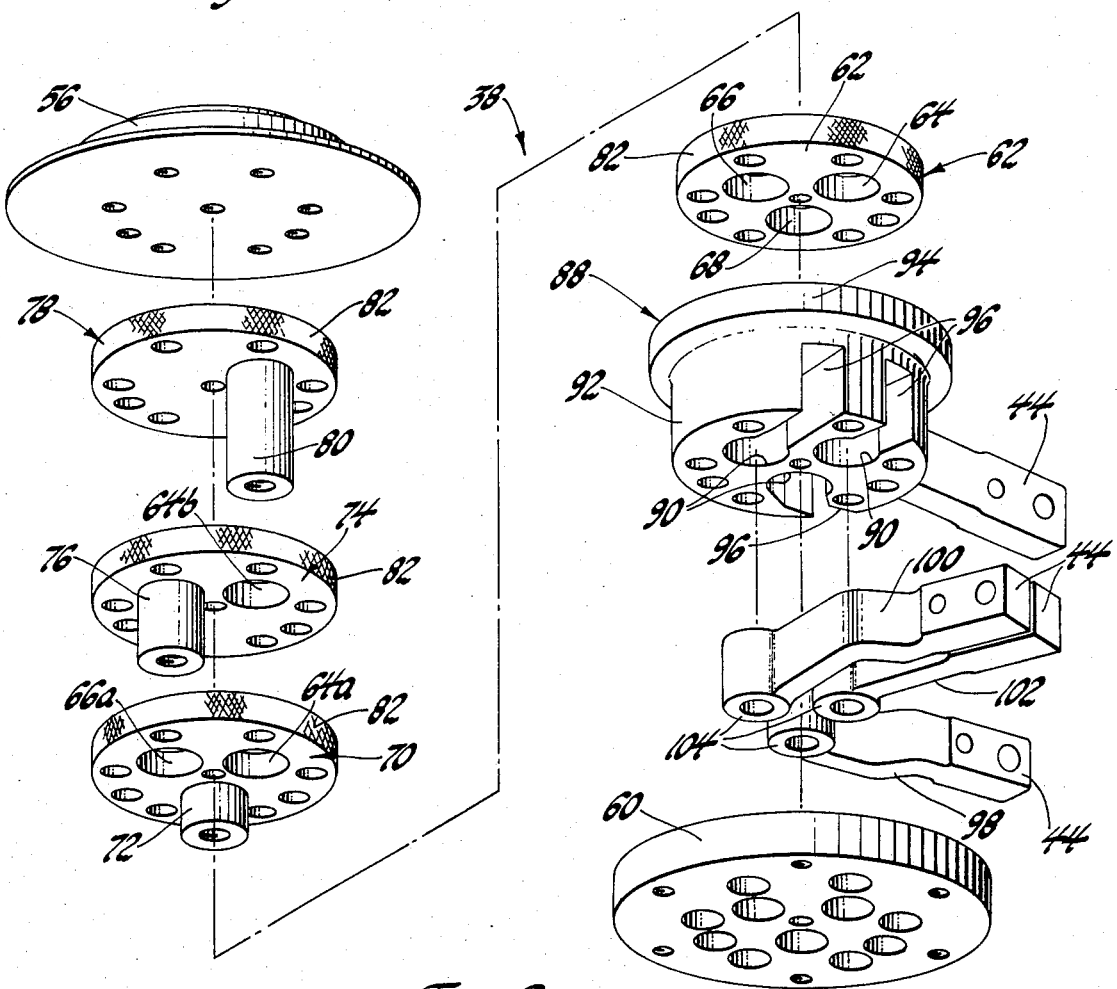
FIG. 6 is an exploded view of the rotatable arbor assembly of a coupling according to the invention.

The structural details of the rotary coupling 38 are shown in FIGS. 2-6. An arbor assembly which is the rotatable portion of the coupling 38 is best shown in FIGS. 5 and 6. A drive plate 56 for coupling to the rotary wrist member of the robot and having a tapered peripheral flange 58 forms one axial boundary of the arbor assembly while an adaptor plate 60 forms the other axial boundary and is the mounting plate for the weld gun 26. For purposes of this description, the drive plate 56 defines the inboard side of the assembly while the adaptor plate 60 forms the outboard side. Four substantially disc-shaped collectors or segments and four bus members outboard of the collectors and electrically coupled to respective collectors are secured between the plates 56 and 60. The first collector 62 which is outboard of the others has three equally spaced, large circular apertures 64, 66 and 68 extending therethrough. The second collector 70 has apertures 64a and 66a in registry with apertures 64 and 66, respectively, and a cylindrical boss 72 on the outboard side of the collector which extends through the aperture 68 in the first collector 62. The third collector 74 positioned inboard of the second collector has an aperture 64b aligned with apertures 64a and 64, and also has a cylindrical boss 76 extending from the outboard side of the collector and extending through the apertures 66a and 66. A fourth collector 78 mounted inboard of the collector 74 has a cylindrical boss 80 extending through the apertures 64b, 64a and 64. Each of the collectors has an accurately machined cylindrical periphery surface 82 for intimately contacting current supply rings 84. The collectors are criss-crossed on the periphery 82 with shallow grooves filled with conductive lubricant to enhance the electrical connection between the collectors and supply rings. The collectors are copper and are preferably plated on the periphery 82 with silver also to enhance the interface conductivity. The collectors are separated from each other and from the driveplate 56 by insulating discs 86 which are provided with openings to match corresponding openings in the mating collectors. For clarity of illustration these insulating members are shown only in FIGS. 2, 3 and 5.

A generally cylindrical first bus 88 has a flat surface directly contacting the outboard surface of the first collector 62. The bus 88 has cylindrical apertures 90 extending therethrough, each in registry with the apertures 64, 66 and 68 of the first collector. The bus has a main body 92 of approximately the same diameter as the collectors and a flange 94 of larger diameter at its inboard end. The main body 92 contains three passages communicating between the three apertures 90 and the outer periphery of the bus. A terminal 44 extends laterally from the main body 92. Second, third and fourth bus members 98, 100 and 102 of elongated configuration extend through the passages 96 and terminate at outer terminals 44, and inner cylinders 104 which are aligned with and engage the bosses 72, 76 and 80 of the second, third and fourth collectors. The bosses as typified by the boss 76 shown in FIG. 5 extend into the apertures 90 of the first bus 88 sufficiently to engage the cylinders 104 of the second, third and fourth bus members. The cylinders 104 each have a central bore and the bosses have a corresponding threaded bore for receiving bolts 106 which secure the bus members 98, 100, 102 to the bosses 72, 76 and 80, respectively. As shown in FIG. 3, the bus terminals 44 protrude from the arbor assembly in pairs which are fastened together but insulated by spacers 108. Small bolt passages are formed in the drive and adaptor plates, the collectors and the first bus member. Two bolts 110 extend through the assembly and are threaded into the drive plate 56 to hold the arbor assembly together. In addition, six equally spaced bolts 112 extend through the arbor assembly and are threaded into the rotary wrist 22 of the robot thereby securely compressing the elements of the assembly together to provide strong load bearing integrity to the assembly. Insulating cylinders 114 surrounding each of the bolts as well as the bosses and inner cylinders 104 provide electrical isolation wherever appropriate. In addition, an insulating disc 116 separates the adaptor plate 60 from the first bus member 88. A central aperture extending through the arbor assembly receives an insulating locating pin 118 for centering the various elements during assembly.

A supply ring 84 surrounds each collector and defines a cylindrical inner surface 120 which mates with the collector periphery 82 to provide a conducting interface. Four supply rings 84 are axially separated by the insulating discs 86 of the arbor assembly to provide electrical isolation. An additional insulator in the form of an annulus 121 separates the outboard supply ring from the first bus member 88. The flange 94 on the first bus and the flange 58 on the drive plate 56 prevent axial movement of the supply rings so that each ring is held adjacent the corresponding collector. A typical supply ring 84 which surrounds the collector 74 is shown in FIG. 4 in plan view and a cross-sectional view is shown in FIG. 5, as well. A lateral projection 124 on one side of the supply ring terminates in a depending terminal 42 which extends out of the plane of the collector to allow connection of the electrical cable 34. The ring is split at one side to form an opening 126. Flanges 128 are formed on either side of the opening and a fluid actuator 130 including a stem 132 is coupled to the flanges to pull the ring tightly around the collector when fluid pressure is applied to the actuator. The opening of the ring, when relaxed, is slightly larger than the collector so that when fluid pressure is removed from the actuator 130 the ring springs back to its normal size to release its grip on the collector. Thus when the supply rings are in their relaxed state the arbor assembly is freely rotatable even though the supply rings are held stationary by the bracket 48. To apply weld current through the rotary coupling the arbor is held stationary and the actuators 130 for all the supply rings are actuated to achieve a tight fit and a good electrical connection between the supply rings and the collectors. The fluid actuators 130 are preferably operated by air pressure. The hoses attached to the actuators 130 are omitted from the drawings for the sake of simplicity as are the air hoses and coolant supply hoses leading to the weld gun 26. A copper tubing 134 conforming to the outer periphery of the supply ring 84 is welded to the supply ring and cooling water is passed through the tubing 134 by hoses not shown for carrying away heat developed within the coupling. Cooling passages not shown may also be incorporated in the arbor assembly, for example, by passages in the bus members 88, 98, 100 and 102 and connecting passages in the bosses 72, 76 and 80 as well as in the bolts 106.

It will thus be seen that the invention when practiced according to the above description allows the rotary support for a dual resistance spot welding gun to carry the welding current to both pairs of weld electrodes so that it functions to carry the weld gun as well as to carry the weld current. Where a single weld gun is to be used the same principles of construction are used and indeed many of the same parts are used. Since only a single circuit is required, the collectors 74, 78, the associated supply rings 84 and the bus members 102 and 104 are omitted. The remaining current carrying members secured by the tie bolts of appropriate length are sufficient to form the two conductive paths for a single weld circuit.

The embodiments of the invention in which an exclusive property or privilege is claimed are defined as follows:

1. In a resistance welding device, means for rotatably supporting a weld gun and coupling electrical current to a weld gun comprising:
   an arbor assembly rotatable about a central axis and having adaptor means for supporting a weld gun and drive means for rotatably driving the assembly;
   the arbor assembly comprising an array of axially spaced segments, each segment having a cylindrical outer periphery and each being electrically connected to the weld gun, and means mechanically securing the segments, the adaptor means and the drive means into a load bearing member.

a nonrotatable supply ring surrounding each segment, and means for urging the supply rings into intimate conductive engagement with the outer periphery of the segments to allow current flow between the rings and segments, and for releasing the rings from the segments to permit rotation of the arbor assembly within the supply rings.

2. In a resistance welding device, means for rotatably supporting a weld gun and coupling electrical current to a weld gun comprising:

an arbor assembly rotatable about a central axis for supporting a weld gun and having drive means for rotatably driving the assembly;

the arbor assembly comprising a plurality of coaxially arranged cylindrical collectors insulated from one another by insulating means, bus means electrically coupled to each collector and to the weld gun, and means axially compressing drive means, the collectors, insulating means and bus means into a load bearing assembly, a plurality of nonrotatable current supply rings, each ring surrounding one of the collectors and having an inner surface for conductively engaging a collector outer surface, and means for clamping the rings to the collectors to facilitate current flow between the rings and collectors and for releasing the rings from the collectors to allow free rotation of the arbor assembly.

3. In a resistance welding device, means for rotatably supporting a weld gun and coupling electrical current to a weld gun comprising:

an arbor assembly rotatable about a central axis for supporting a weld gun and having drive means for rotatably driving the assembly;

the arbor assembly including first and second axially aligned disc shaped collectors with cylindrical outer surfaces and first and second bus members outboard of the collectors and coupled respectively to each collector and to the weld gun, insulating means separating the collectors from one another and separating the bus members from one another, the first collector being apertured and haing a side face in direct engagement with the first bus member side face, the second collector being inboard of the first collector, the first bus member having apertures aligned with those of the first collector, and boss means on at least one of the said second collector and second bus member extending in an axial direction through the apertured first collector and first bus member for electrically coupling the second collector and second bus member, and fastener means axially securing the drive means, the collectors and at least one bus member into a load bearing assembly.

a plurality of nonrotatable current supply rings, each ring surrounding one of the collectors and having an inner surface for conductively engaging a collector outer surface, and means for clamping the rings to the collectors to facilitate current flow between the rings and collectors and for releasing the rings from the collectors to allow free rotation of the arbor assembly.

4. In a resistance welding device, means for rotatably supporting a weld gun and coupling electrical current to a weld gun comprising:

an arbor assembly rotatable about a central axis for supporting a weld gun and having at an inboard end a drive plate for rotatably driving the assembly;

the arbor assembly comprising four axially aligned disc shaped collectors insulated from one another by insulating means, each collector having a cylindrical outer surface, a first collector having three apertures each extending in an axial direction, at least two other collectors having apertures aligned with some of the said three apertures, the collectors inboard of the first collector each having a cylindrical boss extending through the said apertures, four bus members outboard of the collectors for connection to the weld gun, a first bus member adjacent to and conductively connected to the first collector and containing apertures aligned with the apertures in the first collector, three other bus members extending through the apertures in the first bus member and each making electrical contact with one of said bosses, an adapter plate outboard of the bus members for supporting the weld gun, and a plurality of tie bolts extending axially through the drive plate, the adapter plate, the first bus member and the collectors for securing the assembly, a plurality of nonrotatable current supply rings, each ring surrounding one of the collectors and having an inner surface for conductively engaging a collector outer surface, and means for clamping the rings to the collectors to facilitate current flow between the rings and collectors and for releasing the rings from the collectors to allow free rotation of the arbor assembly.

* * * * *